United States Patent
Park et al.

(10) Patent No.: US 6,634,119 B2
(45) Date of Patent: Oct. 21, 2003

(54) ADSORPTIVE ETHANOL DRYING APPARATUS USING MICROWAVES AND OPERATING METHOD THEREOF

(75) Inventors: Jong Kee Park, Daejeon (KR); Soon Haeng Cho, Daejeon (KR); Jong Nam Kim, Daejeon (KR); Jung Il Yang, Daejeon (KR); Hee Tae Beom, Daejeon (KR)

(73) Assignee: Korea Institute of Energy Research (KR)

( * ) Notice: Subject to any disclaimer, the term of this patent is extended or adjusted under 35 U.S.C. 154(b) by 0 days.

(21) Appl. No.: 09/897,800

(22) Filed: Jun. 29, 2001

(65) Prior Publication Data

US 2002/0152633 A1 Oct. 24, 2002

(30) Foreign Application Priority Data

Jan. 8, 2001 (KR) .............................. 2001-999

(51) Int. Cl.⁷ .............................. F26B 3/00; F26B 53/02; F26B 53/06
(52) U.S. Cl. .............................. 34/473; 34/265; 34/332; 34/81; 95/143; 96/125
(58) Field of Search .......................... 34/264, 265, 329, 34/330, 332, 472, 473, 79, 80, 81; 95/113, 143, 105; 96/125; 219/678, 690

(56) References Cited

U.S. PATENT DOCUMENTS

| | | | |
|---|---|---|---|
| 4,237,621 A | 12/1980 | Boismenu | .............. 34/108 |
| 4,312,641 A * | 1/1982 | Verrando et al. | .............. 95/105 |
| 4,373,935 A | 2/1983 | Ausikaitis et al. | .............. 55/33 |
| 4,407,662 A | 10/1983 | Ginder | .............. 55/33 |
| 4,421,651 A * | 12/1983 | Burkholder et al. | .............. 210/672 |

* cited by examiner

*Primary Examiner*—Pamela Wilson
(74) *Attorney, Agent, or Firm*—Baker & Hostetler LLP

(57) ABSTRACT

Disclosed is an adsorptive ethanol drying apparatus in which microwaves are applied during the regeneration of an absorbent conducted in a continuous adsorption process for drying ethanol, so that the absorbent regeneration can be rapidly achieved at a temperature lower than that used in a conventional heating type regeneration method and within a reduced processing time, thereby being capable of allowing an efficient use of energy while improving the productivity per adsorbent mass. A method for operating the adsorptive ethanol drying apparatus is also disclosed. At an adsorption step, a vaporized ethanol azeotropic mixture is forced to pass through adsorption towers to adsorb water contained in the vaporized ethanol azeotropic mixture to an adsorbent charged in each of the adsorption towers while condensing ethanol in a storage tank. Simultaneously with the adsorption step conducted in one of the adsorption towers, microwaves generated from a microwave generating device are guided to the other adsorption tower via waveguides in accordance with a switching operation of a switching waveguide, thereby activating water adsorbed to the adsorbent in the adsorption step to allow the water to be desorbed from the adsorbent. Slight vacuum is also applied to the other adsorption tower, thereby removing the desorbed water.

22 Claims, 2 Drawing Sheets

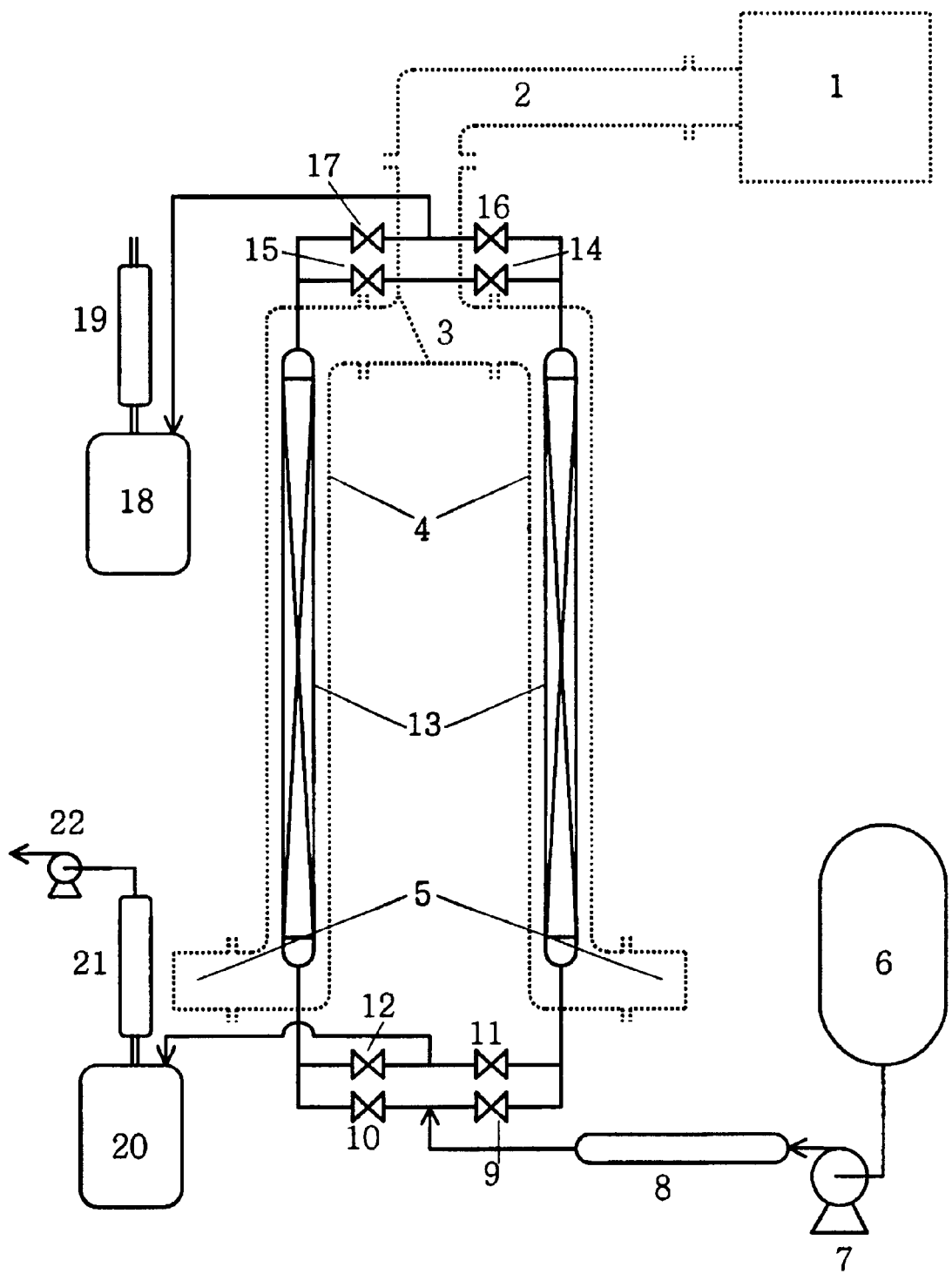
[Fig. 1]

[Fig. 2]
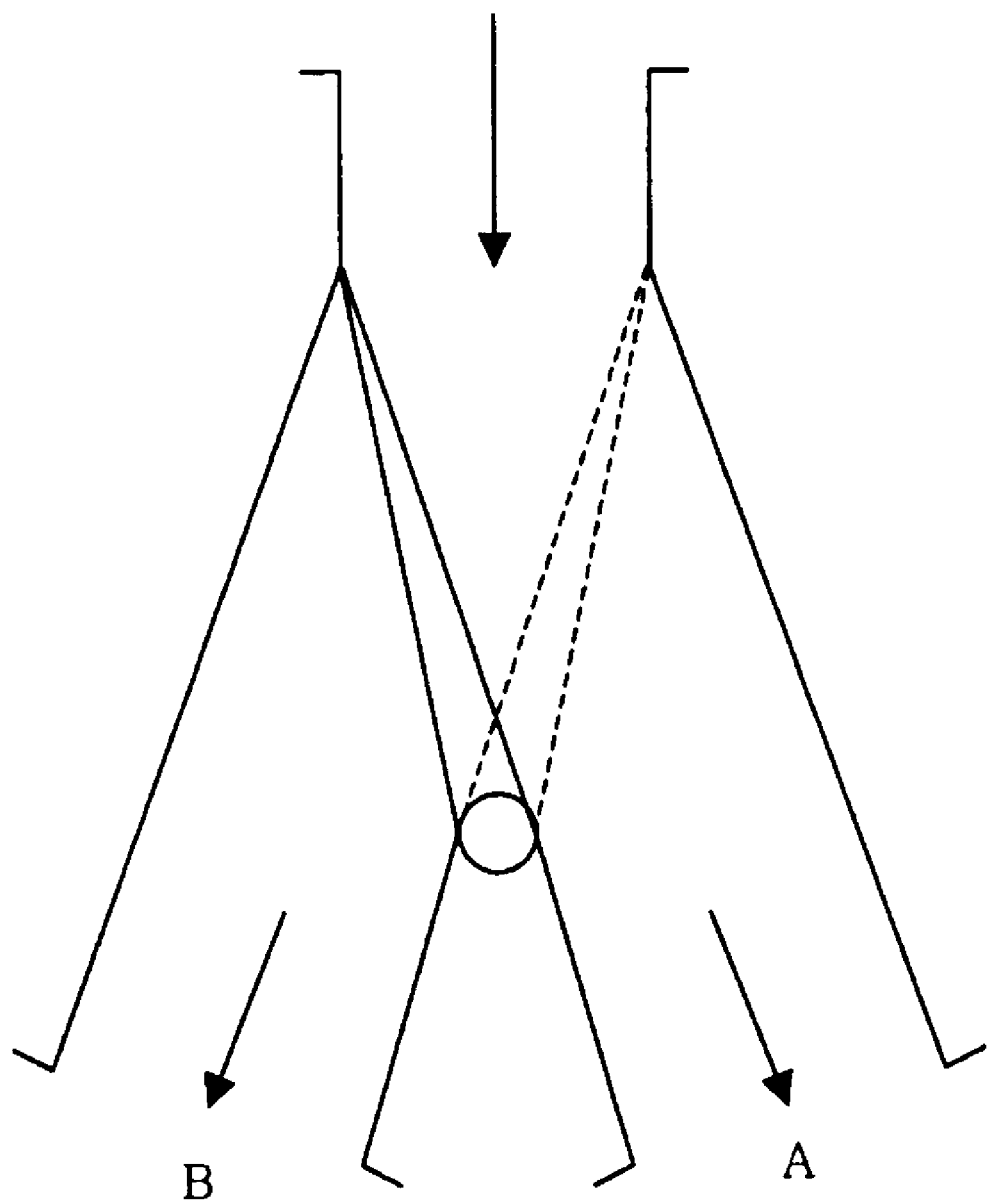

ADSORPTIVE ETHANOL DRYING APPARATUS USING MICROWAVES AND OPERATING METHOD THEREOF

BACKGROUND OF THE INVENTION

1. Field of the Invention

The present invention relates to an adsorptive ethanol drying apparatus using microwaves and an operating method thereof, and more particularly to an adsorptive ethanol drying apparatus in which microwaves are applied during the regeneration of an absorbent conducted in a continuous adsorption process for drying ethanol, so that the absorbent regeneration can be rapidly achieved at a temperature lower than that used in a conventional heating type regeneration method and within a reduced processing time, thereby being capable of allowing an efficient use of energy while improving the productivity per adsorbent mass. The present invention also relates to a method for operating this adsorptive ethanol drying apparatus.

2. Description of the Related Art

An azeotrope of water and ethanol (92–95% ethanol) can not be separated into water and ethanol using normal distillation process. Since water molecules in this azeotropic mixture are selectively adsorbed on zeolite 3A or 4A, these molecular sieves are conventionally used in ethanol drying. When the ethanol azeotropic mixture is passed through the adsorption tower, water molecules are adsorbed to the adsorbent, so that ethanol of a high purity (95.5 wt %) is produced. Once the adsorbent is saturated with water, it should be dehydrated for a subsequent re-use thereof. For a dehydration of the adsorbent, a heating type description process has been conventionally used. The heating type desorption process involves heating the adsorbent to about 300° C. or more.

Generally, molecules having dipolar moment, such as water molecules, are easily heated or exhibits an increased mobility when they are irradiated by microwaves. Where microwaves are applied to the regeneration of an adsorbent adsorbed with polar molecules, the energy of the microwaves is consumed to directly heat the adsorbate or to increase the mobility of the adsorbate without being consumed to heat the adsorbent because the adsorbent is less sensitive to the microwaves. In this case, accordingly, the regeneration of the adsorbent can be achieved at a temperature lower than that of a heating type desorption process, for example, at a temperature of about 200° C.

Various techniques associated with an adsorptive ethanol dehydrating process or apparatus have been known. For example, there is a method in which had adsorption heat generated in accordance with an adsorption of molecules is efficiently used at a subsequent adsorption step (U.S. Pat. No. 4,373,935), a method in which ethanol produced is supplied in a heated state in a desorption process (U.S. Pat. No. 4,407,662), a method in which carbon dioxide of a high pressure is supplied in a desorption process (U.S. Pat. No. 4,273,621), and a method in which heated ethanol vapor is supplied along with carbon dioxide in a desorption process. However, these techniques are different from the present invention in that they do not apply microwaves during a desorption process.

The present invention is adapted to apply microwaves in a desorption process for regenerating an adsorbent adsorbed with polar molecules such as water, thereby allowing the desorption process to be conducted at a low temperature, as compared to a conventional heating type desorption process, so that it is possible to improve the productivity per adsorbent mass.

The present invention relates to an adsorbent regeneration method wherein microwaves are applied in a continuous adsorption process in which substances sensitive to microwaves are adsorbed to an adsorbent. Conventionally, an adsorbent strongly adsorbed with substances is regenerated by directly heating it to a high temperature or using a heated material such as hot steam or gas. In accordance with the present invention, microwaves are irradiated to the adsorbate in order to desorb the adsorbate from the adsorbent.

When microwaves are irradiated to polar molecules such as water, the mobility of those molecules is increased as the arrangement of the molecules is continuously changed. At this time, an increase in temperature also occurs due to frictional heat generated among the molecules. By virtue of the increased mobility of molecules and the increased temperature resulting from an application of microwaves, the molecules adsorbed to the adsorbent can be easily desorbed from the adsorbent, so that the adsorbent is regenerated.

SUMMARY OF THE INVENTION

Therefore, an object of the invention is to provide an adsorptive ethanol drying apparatus using microwaves and an operating method thereof, in which microwaves are applied in an adsorbent regeneration process, so that the ethanol regeneration process is conducted at a relatively low temperatures, as compared to conventional adsorptive ethanol drying processes.

Another object of the invention is to provide an adsorptive ethanol drying apparatus using microwaves and an operating method thereof, which are capable of achieving a desorption of substances adsorbed to the adsorbent without any requirement to cool the adsorbent or while involving a cooling process for a reduced time, thereby improving the productivity per adsorbent mass.

In accordance with one aspect, the present invention provides an adsorptive ethanol drying apparatus for vaporizing ethanol supplied from an ethanol storage tank, and adsorbing water contained in the vaporized ethanol to an adsorbent charged in adsorption towers while condensing ethanol of a high purity, free of the water, in a separate storage tank, comprising: a microwave generating device for generating microwaves; a first waveguide connected to the microwave generating device; a switching waveguide connected to the microwave generating device via the first waveguide and pneumatic driven to switch the microwaves between the adsorption towers; a second waveguide arranged around each of the adsorption towers and connected to the switching waveguide, the second waveguide serving to guide the microwaves transmitted from the switching waveguide to the adsorption tower; and a vacuum pump adapted to apply vacuum to the adsorption towers for an easy desorption of adsorbates adsorbed to the adsorbent in the adsorption towers; whereby the adsorbates adsorbed to the adsorbent in the adsorption towers are desorbed by the waveguides guided to the adsorption towers in an alternating fashion by the switching waveguide and the vacuum generated by the vacuum pump.

In accordance with another aspect, the present invention provides an adsorptive ethanol drying method for forcing a vaporized ethanol azeotropic mixture to pass through adsorption towers to adsorb water contained in the vaporized ethanol azeotropic mixture to an adsorbent charged in each of the adsorption towers while condensing ethanol in a storage tank, comprising the steps of: simultaneously with the adsorption step conducted in one of the adsorption towers, guiding microwaves generated from a microwave generating device to the other adsorption tower via waveguides in accordance with a switching operation of a switching waveguide, thereby activating water adsorbed to the adsorbent in the adsorption step to allow the water to be desorbed from the adsorbent; and applying slight vacuum to the other adsorption tower, thereby removing the desorbed water.

BRIEF DESCRIPTION OF THE DRAWINGS

The above objects, and other features and advantages of the present invention will become more apparent after a reading of the following detailed description when taken in conjunction with the drawings, in which:

FIG. 1 is a schematic view illustrating a continuous adsorptive ethanol separating or drying apparatus according the present invention; and FIG. 2 is a schematic view illustrating a switching waveguide included in the apparatus according to the present invention.

DESCRIPTION OF THE PREFERRED EMBODIMENTS

The present invention relates to an apparatus and method for irradiating microwaves to an adsorbent adsorbed with strong adsorptive substances in a regeneration process, thereby effectively regenerating the adsorbent. Now, the present invention will be described in conjunction with the annexed drawings.

Referring to FIG. 1, ethanol of 92 to 95 wt %, as a raw material, in a raw ethanol storage tank 6 is supplied to a vaporizer 8 by a supply pump 7. As the raw material passes through the vaporizer 8, it is vaporized while being heated to a temperature of about 100° C. The vaporized raw material is then introduced into an adsorption tower 13 via an electronic valve 9. As the vaporized raw material passes through the adsorption tower 13, water contained in the vaporized raw material is adsorbed to an adsorbent. As a result, ethanol with a high purity of 99.5 wt % is produced. This high purity ethanol is then introduced into a product storage tank 18 via an electronic valve 16. The ethanol, which is introduced into the product storage tank 13 in a non-condensed state, is condensed by a product condenser 19 so that liquefied ethanol is stored in the product storage tank 18. Simultaneously with the production of ethanol conducted in one adsorption tower 13 in accordance with the above mentioned adsorption process, a desorption process is conducted in another adsorption tower 13. That is, a microwave generating device 1 and a vaporizing pump 22 are operated in the desorption process. Also, a microwave switching waveguide 3 is switched to the adsorption tower 13 where a desorption process is conducted. Microwaves generated from the microwave generating device 1 passes through a waveguide 2, the switching waveguide 3, and a waveguide 4 arranged around the adsorption tower 13, in this order. Thus, water is desorbed from the adsorbent passing through the adsorption tower 13 by the microwaves. The desorbed water is then fed to an adsorbate storage tank 20 via an electronic valve 12. The desorbed water, which is introduced into the adsorbate storage tank 20 in a non-condensed state, is condensed by an adsorbate condenser 21 so that liquefied adsorbate is stored in the adsorbate storage tank 20. The adsorption and the desorption using microwaves are conducted in an alternating fashion at intervals of a desired time. Thus, ethanol of a high purity is continuously produced.

In order to increase the degree of recovery of ethanol, the electronic valves 11 and 12 installed at respective bottoms of the towers 13 or the electronic valves 14 and 15 installed at respective tops of the towers 13 are opened for a desired period of time between the adsorption and desorption processes to recovery ethanol vapor, existing in the adsorption tower 13 at the point of time when the adsorption step is completed, to the tower 13 where the desorption step is completed.

The switching waveguide 3 shown in FIG. 2 is designed to supply microwaves to two adsorption towers 13 in an alternating fashion. In this switching waveguide 3, an pneumatic actuator is attached to a shaft to which a microwave reflecting plate is connected. The actuator is rotated in a clockwise and anti-clockwise directions by a pneumatic pressure of about 50 psi in order to change the direction of the reflecting plate.

The operation and effect of the adsorptive ethanol drying apparatus will be described in more detail. In an ethanol adsorption process, a vaporized ethanol azeotropic mixture is forced to pass through an adsorption tower 13, thereby adsorbing water to the adsorbent in the adsorption tower 13 while condensing ethanol in the ethanol storage tank. Simultaneously with this ethanol adsorption process for producing ethanol, microwaves generated from the microwave generating device 1 are transmitted to the adsorption tower 13 via the, waveguide 2, switching waveguide 3, and waveguide 4, thereby activating water adsorbed to the adsorbent. Also, slight vacuum is applied to the adsorption tower 13. Thus, water is desorbed from the adsorbent, and then removed.

In order to increase the degree of recovery of ethanol, the electronic valves 11 and 12 installed at respective bottoms of the towers 13 or the electronic valves 14 and 15 installed at respective tops of the towers 13 are opened for a desired period of time between the adsorption and desorption processes, thereby allowing ethanol vapor, existing in the adsorption tower 13 at the point of time when the adsorption step is completed, to be recovered to the tower 13 where the desorption step is completed. Ethanol azeotropic mixture vapor is forced to pass through an adsorption layer of zeolite 3A or 4A, so that dried ethanol is obtained. During the desorption process, vacuum of 100 to 300 mmHg is applied along with an irradiation of microwaves. Thus, the adsorbent is regenerated.

The flow rate of the liquid-phase raw material is set to be 1.64 ml/hr per the unit weight (g) of the adsorbent charged in one adsorption tower. Also, respective adsorption and desorption times are set to be 4 minutes. In this case, the incidence power of microwaves is set to be 6.4 W per the unit weight (g) of the adsorbent charged in one adsorption tower. Alternatively, the flow rate of the liquid-phase raw material may be varied from 1.1 ml/hr to 2.2 ml/hr per the unit weight (g) of the adsorbent charged in one adsorption tower. In this case, respective adsorption and desorption times are set to be inversely proportional to the flow rate of the liquid-phase raw material. Also, the incidence power of microwaves is set to be proportional to the flow rate of the raw material.

Now, the present invention will be described in conjunction with examples which are not intended to limit the technical scope of the present invention.

EXAMPLE 1

An ethanol drying test was conducted for ethanol of 92.7 wt % in an apparatus using two quartz tube type adsorption towers (inner diameter: 9.8 mm, and effective height: 70 cm) having a configuration shown in FIG. 1. Zeolite 4A was charged in an amount of 55 g in each adsorption tower. In this ethanol drying test, the apparatus was operated in such a fashion that an adsorption process was conducted in one of the two towers whereas a desorption process was conducted in the other tower. Respective adsorption and desorption times were set to be 4 minutes. The flow rate of the liquid-phase raw material was set to be 1.5 ml/hr per unit weight (g) of the adsorbent. Also, an incidence power of microwaves set to be 350 W and a desorption pressure of 180 mmHg were used. The purity of the ethanol product obtained after the adsorption process was 99.5 wt %. The degree of recovery was 70%.

Under the condition in which the flow rate of the liquid-phase raw material was varied from 1.1 ml/hr to 2.2 ml/hr hr per unit weight (g) of the adsorbent, respective adsorption and desorption times were set to be 6 minutes and 3 minutes, respectively, and the incidence power of microwaves was set to be proportional to the flow rate of the raw material, the same effect was obtained within a product concentration range of 0.3 wt %.

EXAMPLE 2

An ethanol drying test was conducted for ethanol of 92.7 wt % in the same apparatus as that of Example 1 under the condition in which zeolite 3A was charged in an amount of 53 g in each adsorption tower. After completion of adsorption and desorption steps, the electronic valves 14 and 15 shown in FIG. 1 were opened for 5 seconds to recover ethanol vapor, left in the adsorption tower at the point of time when an adsorption step was completed, to the desorption tower where a desorption step was completed. That is, a processing cycle was established which consists of an adsorption step, a uniform pressurization step, a desorption step, and a uniform pressurization step. Respective processing times of the processing steps in this processing cycle were 3 minutes and 55 seconds, 5 seconds, 3 minutes and 55 seconds, and 5 seconds. Under the condition using 1.5 ml/hr as the flow rate of the raw material, 350 W as the incidence of power of microwaves, and 180 mmHg as the desorption pressure, ethanol with a purity of 99.5 wt % was obtained. At this time, the rate of recovery was 84%.

As apparent from the above description, the adsorptive ethanol drying apparatus of the present invention can be operated at a low temperature, as compared to conventional cases using hot steam or a heated adsorbent, because it uses microwaves in a process for regenerating an adsorbent. In particular, the energy of the microwaves is not used to heat the adsorbent, but concentrated to increase the mobility of an adsorbate adsorbed to the adsorbent. Accordingly, the amount of energy used in the process is reduced. Since the regeneration of the adsorbent is achieved at a low temperature, as compared to the conventional methods, it is possible to eliminate a process for cooling the adsorbent to a temperature enabling an execution of the adsorption step or to reduce the processing time for the cooling process. Accordingly, the productivity per adsorbent mass is improved.

Although the preferred embodiments of the invention have been disclosed for illustrative purposes, those skilled in the art will appreciate that various modifications, additions and substitutions are possible, without departing from the scope and spirit of the invention as disclosed in the accompanying claims. For example, although the present invention has been described in conjunction with an adsorption process for separating ethanol and water from each other, it may also be applied to an adsorption process for the purification of aldehyde or the separation of an ethanol/propanol mixture.

What is claimed is:

1. An adsorptive ethanol drying apparatus for vaporizing ethanol supplied from an ethanol storage tank, and adsorbing water contained in the vaporized ethanol to an adsorbent charged in adsorption towers while condensing ethanol of a high purity, free of the water, in a separate storage tank, comprising:

a microwave generating device for generating microwaves;

a first waveguide connected to the microwave generating device;

a switching waveguide connected to the microwave generating device via the first waveguide and pneumatic driven to switch the microwaves between the adsorption towers;

a second waveguide arranged around each of the adsorption towers and connected to the switching waveguide, the second waveguide serving to guide the microwaves transmitted from the switching waveguide to the adsorption tower; and a vacuum pump adapted to apply vacuum to the adsorption towers for an easy desorption of adsorbates adsorbed to the adsorbent in the adsorption towers;

whereby the adsorbates adsorbed to the adsorbent in the adsorption towers are desorbed by the waveguides guided to the adsorption towers in an alternating fashion by the switching waveguide and the vacuum generated by the vacuum pump.

2. An adsorptive ethanol drying method for forcing a vaporized ethanol azeotropic mixture to pass through adsorption towers to adsorb water contained in the vaporized ethanol azeotropic mixture to an adsorbent charged in each of the adsorption towers while condensing ethanol in a storage tank, comprising the steps of:

simultaneously with the adsorption step conducted in one of the adsorption towers, guiding microwaves generated from a microwave generating device to the other adsorption tower via waveguides that surround the towers in accordance with a switching operation of a switching waveguide, thereby activating water adsorbed to the adsorbent in the adsorption step to allow the water to be desorbed from the adsorbent; and applying slight vacuum to the other adsorption tower, thereby removing the desorbed tower.

3. The adsorptive ethanol drying method according to claim 2, further comprising the step of:

opening electronic valves installed at respective bottoms of the towers or electronic valves installed at respective tops of the towers for a desired period of time between the adsorption and desorption steps, thereby recovering ethanol vapor, existing in the tower at the point of time when the adsorption step is completed, to the tower where the desorption step is completed, to increase the degree of recovery of ethanol.

4. The adsorptive ethanol drying method according to claim 2, wherein a zeolite 3A or 4A adsorbent charged in each of the adsorbent towers so that dried ethanol is obtained, and the vacuum applied in the desorption step along with microwaves to regenerate the adsorbent is 100 to 300 mmHg.

5. The adsorptive ethanol drying method according to claim 4, wherein the adsorption and desorption steps are conducted under a condition in which the flow rate of the liquid-phase raw material for supplying the vaporized ethanol azeotropic mixture is set to be 1.5 ml/hour per the unit weight of the adsorbent charged in each of the adsorption tower, respective adsorption and desorption times are set to be 4 minutes, and an incidence power of microwaves is set to be 6.4 W per unit weight of the adsorbent charged in each of the adsorption tower.

6. The adsorptive ethanol drying method according to claim 5, wherein the flow rate of the raw material is varied from 1.1 ml/hr to 2.2 ml/hr per the unit weight of the adsorbent charged in each of the adsorption tower, the adsorption and desorption times are set to be inversely proportional to the feed flow rate of raw material, and the incidence power of microwaves is set to be proportional to the flow rate of the raw material.

7. An ethanol drying apparatus, comprising:
   a microwave generating device;
   a first waveguide coupled to and in communication with the microwave generating device;
   a microwave switching waveguide in communication with the first waveguide; and
   a second waveguide in communication with the microwave switching waveguide and disposed about a first and a second adsorption towers.

8. The ethanol drying apparatus of claim 7, wherein the microwave switching waveguide further comprises a pneumatic actuator coupled to a microwave reflecting plate.

9. The ethanol drying apparatus of claim 7, further comprising a vacuum pump in communication with the first and second adsorption towers.

10. A method of drying ethanol, comprising:
    supplying vaporized raw ethanol at a predetermined flow rate to a first or a second adsorption towers having an adsorbent;
    adsorbing water with the adsorbent to generate highly pure ethanol for a period of time;
    generating a microwave at a predetermined power with a means for microwave generation;
    directing the microwave with a first waveguide to a microwave switching waveguide; and
    directing the microwave with the microwave switching waveguide to a second waveguide that is disposed about the first and the second adsorption towers to desorb the water from the adsorbent for a period of time.

11. The method of claim 10, wherein directing the microwave with the microwave switching waveguide comprises switching the microwave between the first and the second adsorption towers.

12. The method of claim 10, further comprising applying a vacuum from a vacuum pump to said adsorption towers to remove the water and opening electronic valves that are in communication with the first and second adsorption towers for a predetermined amount of time to increase the degree of recovery of the ethanol.

13. The method of claim 12, wherein the vacuum pressure applied is from 100 to 300 mmHg.

14. The method of claim 13, where in the vacuum pressure applied is 180 mmHg.

15. The method of claim 10, wherein the adsorbent is selected from a group consisting of zeolite 3A and 4A.

16. The method of claim 10, wherein the vaporized raw ethanol is supplied to the adsorption towers at the flow rate of 1.1 ml/hr to 2.2 ml/hr per unit weight (g) of adsorbent.

17. The method of claim 10, wherein the adsorbing time is 4 minutes and the desorbing time is 4 minutes.

18. The method of claim 10, wherein the power of the microwave generated is 6.4 W per unit weight (g) of the adsorbent.

19. The method of claim 10, wherein the adsorbing time and the desorping time are inversely proportional to the flow rate of the vaporized raw ethanol.

20. The method of claim 10, wherein the power of the microwave is proportional to the flow rate of vaporized raw ethanol.

21. The method of claim 10, where in the flow rate of vaporized raw ethanol is 1.5 ml/hr per unit of weight unit weight (g) of the adsorbent.

22. The method of claim 10, wherein the power of the microwave is 350W.

* * * * *